Jan. 27, 1959     C. M. BEHM ET AL     2,871,061
ROLLER SKATE WHEEL
Filed Nov. 16, 1955

INVENTOR.
CARL M. BEHM,
MICHAEL BUSHI AND
STEVE BUSHI.
BY Oberlin & Limbach
ATTORNEYS.

United States Patent Office 2,871,061
Patented Jan. 27, 1959

2,871,061

ROLLER SKATE WHEEL

Carl M. Behm, Parma Heights, Michael Bushi, Cleveland, and Steve Bushi, Seven Hills, Ohio Application November 16, 1955, Serial No. 547,262

5 Claims. (Cl. 301—5.3)

The present invention, while indicated specifically as relating to a roller skate wheel, is more generally concerned with a wheel and bearing structure which may have utility elsewhere than in connection with rink roller skates. However, because the instant wheel and bearing is adapted for use on rink roller skates to effect certain advantageous results as hereinafter pointed out, the same will be described in that connection.

At the present time, rink skates are equipped either with maple wheels or with phenolic resin wheels, the latter usually having rubber particles dispersed therein for increased friction and resilience. Such wheels, whether of maple or resin, have a relatively short life and are relatively heavy. Furthermore, special provision must be made for bearings, all of which adds to the expense of the wheels.

For instance, in a maple wheel, concavely curved metal stampings in the form of rings are provided with prongs or other attaching means by which said rings may be secured in complementary machined recesses in the wheel body itself. Moreover, the maple wheels are unstable in that they expand and contract substantially under varying conditions of humidity. Moreover, maple wheels often split or crack, and stamped metal bearing races are not altogether satisfactory.

Moreover, the bearing retaining nuts must first be tightened and then backed off to provide adequate play so that thermal expansion will not cause the wheels to bind during skating around the rink floor. The phenolic wheels with the rubber particles also are apt to crack or split, and it has been found that the rubber particles mar the rink floor, especially when the skates skid sideways. In addition, the provision of precision bearings requires the machining of counterbores from opposite sides of the phenolic wheels so that hardened ball bearing races may be tightly fitted therein. As a further disadvantage of existing skate wheels, it has been found that they are quite noisy.

With the foregoing in mind, it is one principal object of this invention to provide a lightweight, inexpensive composite wheel including a hollow stamped metal shell having molded therearound a thin layer of nylon or like hard, strong, tough, and resilient layer of organic thermoplastic material.

It is another object of this invention to provide a wheel of the character indicated in which the bearing races are molded of nylon or equivalent material as an incident to the above-described molding operation.

It is another object of this invention to provide a unique form of wheel bearing in which the races for a plurality of balls are formed with opposed spherical and conical surfaces between which the balls are engaged for head-over-heels rotation, without skidding.

It is another object of this invention to provide a wheel bearing in which both of the bearing races are made of nylon or equivalent strong, wear-resisting, organic thermoplastic material which requires no lubrication and which enables initial adjustment without axial wheel play and without resulting binding when in use and in heated condition.

It is another object of this invention to provide a wheel in which the lightweight hollow supporting shell is of strong, sturdy, non-collapsible structure and which is of multipart form but yet does not require welding or other joint-sealing operations.

It is yet another object of this invention to provide a novel method and mold for forming a plastic-covered wheel having the characteristics aforesaid.

It is still another object of this invention to provide a wheel of ornate appearance especially with reference to selection of colored nylon or equivalent plastic material which is of the same color throughout its thickness and which color may be selected to match or harmonize with the skates or skater's attire.

Still another object of this invention is to provide a wheel and bearing structure which eliminates the necessity of employing lock washers or the like when mounting the wheel on a skate axle.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 3:
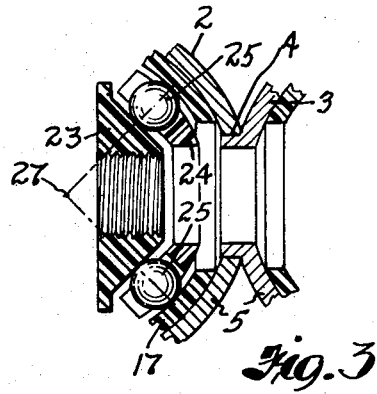
Figure 4:
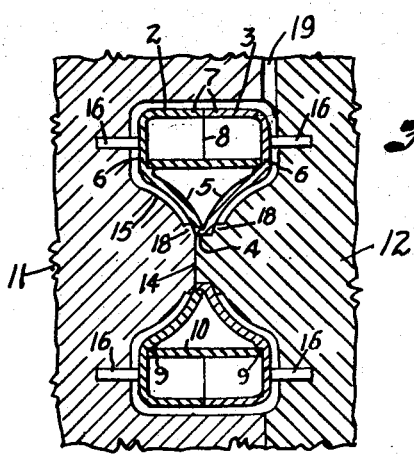

Fig. 3 is an enlarged fragmentary cross-section view showing the bearing which is employed in the wheel, the axle having been omitted for sake of clarity; and Fig. 4 is a cross-section view showing the mold for molding nylon or equivalent organic plastic material around the hollow sheet metal shell of the wheel and showing the manner of centering the shell and holding the component parts thereof in tight engagement to prevent leakage of the plastic material therebetween during the molding operation.

Referring now more particularly to the several figures of the drawing, the composite wheel 1 herein comprises complementary sheet metal stampings 2 and 3 which are identical except that the part 3 is formed with an annular lip 4 which snugly fits into a central opening in the other part, thus requiring only a single die with inserts to form the opening in part 2 or the lip 4 in part 3. The provision of such inserts is a well-known practice in the metal stamping and drawing art and need not be elucidated upon herein.

Figure 1:
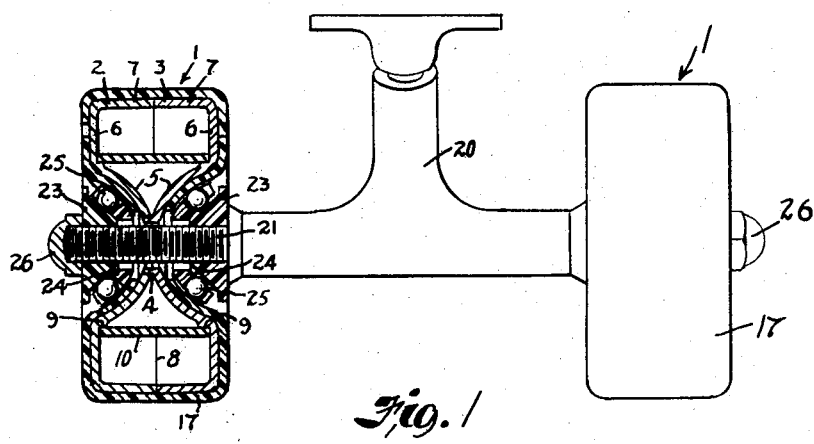
Fig. 1 is an elevation view of a rink skate trunk, on the axle of which is mounted a pair of wheels according to this invention, one of said wheels being shown in cross-section.
Figure 2:
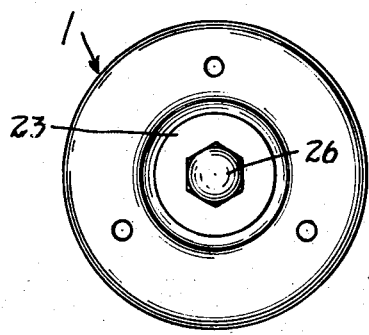
Fig. 2 is an elevation view of the present wheel as viewed from the lefthand side of Fig. 1.

Each stamping 2 and 3 has a central, spherical recess portion 5, a contiguous annular side portion 6, and an outer rim or axial flange portion 7, the stampings being formed so that, when assembled together, the edges of the axial flanges 7 meet along the line 8 as shown in Fig. 1.

The metal stampings 2 and 3 are also formed with a plurality of locating bosses 9 which snugly fit into the ends of a short length of tube 10, the length of said tube preferably being equal to the distance between the opposite inside faces of the complementary stampings. Such piece of tube 10, together with the lip 4 of stamping 3 fitting within the center hole of the other stamping 2, serves to accurately position the shells in coaxial relation with the meeting edges 8 flush with one another.

In forming the shells 2 and 3, the axial flanges 7 are disposed at a slight angle, such as 2 or 3° for example, to the axis of the wheel so that the peripheral surface of the shell assembly will be slightly crowned for added strength. The piece of tube 10 also serves (and this is one of its main functions) to prevent distortion of the shell assembly under the influence of the high injection pressures involved in the molding of nylon or equivalent plastic therearound.

The interfitting shell parts 2 and 3 and tube 10, as aforesaid, are preferably dimensioned so that these three parts, when assembled, will remain together for convenience in handling during the molding operations.

In Fig. 4, there is shown a pair of die blocks 11 and 12 providing a locating pilot 14 which centers the shell assembly in the mold cavity 15, the walls of which cavity are uniformly spaced from the opposite spherical surfaces 5, the opposite sides 6, and the periphery 7 of the shell assembly. In order to tightly hold the meeting edges 8 of the stampings 2 and 3 together against leakage of plastic material therebetween and into the hollow shell assembly, the die blocks 11 and 12 are provided with a series of oppositely disposed pins 16 which, when the die blocks are in mating engagement, serve to tightly press the stampings 2 and 3 together at their meeting joint 8.

Furthermore, said pins 16 serve to position the shell assembly so that its median plane is perpendicular to the axis whereby the thickness of plastic 17, when injected in the mold cavity 15, will be uniformly accurate on opposite sides of the finished wheel on the opposite spherical surfaces and around the periphery. The die blocks 11 and 12 are also formed with clamping shoulders 18 which serve to tightly clamp the inner portions of the shells 2 and 3 together to eliminate this area as a source of leakage of plastic into the shell assembly.

With the shell assembly thus securely and accurately clamped between the die blocks 11 and 12, the molten organic plastic material such as nylon or equivalent material, is injected into the cavity 15 as by way of the sprue 19. By employing a die block assembly, as shown, it is unnecessary to seal the shell joints as by welding or other means.

The wheel 1 thus formed has integral, smooth, and accurate spherical bearing surfaces as determined by the smooth and accurate spherical surfaces formed in the mating die blocks 11 and 12, and the bearing and side portions of the composite wheel thus formed serve to securely hold the uniform thickness tire or peripheral portion in place backed up by the crowned axial flanges 7 of the metal stampings 2 and 3.

It has been found from experience that the composite wheel 1 herein costs considerably less than, and is much lighter than a solid nylon wheel, especially when the shells 2 and 3 and tube 10 are made of aluminum or like lightweight metal. This is true even in the case of steel stampings 2 and 3 and steel tube 10, since the steel parts may be of lighter gauge metal for strength equivalent to aluminum parts. In addition, the composite wheel 1 herein has certain advantages which are not obtainable with a solid wheel whether the solid wheel be made of phenolic or nylon.

As aforesaid, the composite wheel 1 has opposite spherical bearing surfaces of nylon or equivalent organic plastic material. These spherical surfaces constitute races for ball bearings. As shown in Fig. 1, the skate truck 20 has an axle 21 extending therethrough which is threaded at its opposite ends. In assembling the wheels 1 on the axle 21, molded nylon bearing race members 23 are threaded onto said axle against the body or ends of the truck 20.

Then, one bearing cage 24, also formed of nylon or equivalent material, and the steel balls 25 in the radial slots of the cage are set in one of the spherical recesses of the wheel 1, whereupon the wheel 1 is then slipped over the threaded end of the axle to engage the balls 25 between the conical inner bearing race of the member 23 and the outer spherical bearing race of the wheel. The other bearing cage 24 and balls 25 are then placed in the opposite spherical recess of the wheel and the outer nylon bearing member 23 is screwed onto the end of the axle 21.

By reason of the special design of the wheel and bearings, the outer member 23 may be screwed in to take up axial play in the wheel and, when this is done, a cap nut 26 or the like is threaded onto the end of the axle 21 to frictionally engage the outer end of the outer retainer member 23. Thus, no lock washers, lock nuts, or the like need be employed as is the conventional practice in the now known rink skates.

Referring in further detail to the bearing, reference may be had to Fig. 3. In this case, the inner bearing race of member 23 is a conical surface having an included angle of 90°, for example. Preferably, the axis of the outer spherical bearing surface of the wheel 1 coincides at 27 with the apex of a cone whose conical surface is normal to the conical surface of member 23 and passes through the axes of balls 25.

Thus, as the wheel 1 rotates, diametrically opposite sides of the balls 25 are tangent to the outer spherical and inner conical races, whereby the balls will be caused to rotate head-over-heels around an orbit having the center of the wheel 1 and axle 21 as an axis. By reason of this disposition of the conical and spherical bearing surfaces, the balls 25 are held against outward radial movement by centrifugal force and also are maintained in a plane perpendicular to the axis of the wheel 1, since there is only one place that the races are spaced apart a distance equal to the diameters of the balls 25. In other words, the balls cannot move outward or inward by reason of the convergence of the races both outward and inward from the points engaged by the balls 25.

The flanges of the retainers 23 serve to protect the races from ingress of foreign matter, and the shape of the cage 24 also serves this purpose to some extent.

Because the races are of nylon or equivalent hard, tough, wear-resisting organic plastic material, the bearings have an unexpectedly long life and do not require any lubrication whatever, there being no tendency to seize or score even without lubrication.

The wheel 1 made according to our invention is unusually quiet running as compared with maple and phenolic wheels which are currently in use and the nylon periphery or tire which is relatively thin has certain desirable characteristics, namely, (a) The nylon periphery, or tread, will absorb or pick up the floor treatment (generally resin) due to the imbedability property of nylon, thus ensuring good traction;

(b) The relatively thin nylon tread, backed by the rigid and concentric inner core, will prevent objectionable flat spots from being worn on such tread; and (c) The extreme toughnesss and abrasion resistance of the nyon tread ensures longer wear life.

These desirable characteristics are not realized with prior art wheels as applied to rink skates.

As previously mentioned, although the wheel and bearing disclosed herein is especially useful in connection with rink skates, it is to be understood that the same may be used as a caster wheel on furniture, as a hand truck wheel, and elsewhere wherever a free-running, lightweight, strong, durable, and precision ball bearing wheel is found desirable or necessary.

Other modes of applying the principle of the invention may be employed, change being made as regards to the details described, provided the features stated in any of the following claims, or the equivalent of such, be employed.

We therefore particularly point out and distinctly claim as our invention:

1. A composite wheel structure comprising complementary annular sheet metal stampings which are formed with inner telescoping portions and outer abutting annular rims and which define a hollow annular shell, said shell having opposite recesses extending outwardly from the inner telescoped portions, and an integral layer of organic plastic material embracing the periphery and opposite sides of said shell, and also overlying such recesses to provide bearing surfaces composed of such plastic material and backed up by said stampings.

2. A composite wheel structure comprising a pair of complementary annular sheet metal stampings which form a hollow annular shell including an outer generally cylindrical wall, outer annular side wall portions, and inner depressions concentric with such cylindrical wall, a length of tube disposed coaxially inside said shell and spanning the space between the junctures of such depressions with such outer side wall portions, and an integral layer of organic plastic material embracing such cylindrical wall and overlying such outer side wall portions, said tube reinforcing said shell against side wall collapse.

3. A composite wheel structure comprising a pair of complementary annular sheet metal stampings which form a hollow annular shell including an outer generally cylindrical wall, outer annular side wall portions, and inner depressions concentric with such cylindrical wall, a length of tube disposed coaxially inside said shell and spanning the space between the junctures of such depressions with such outer side wall portions, and an integral layer of organic plastic material embracing such cylindrical wall and overlying such outer side wall portions and such depressions to provide bearing surfaces composed of such plastic material backed up by the depressions in said shell.

4. A composite wheel structure comprising a pair of complementary annular sheet metal stampings which form a hollow annular shell including an outer generally cylindrical wall, outer annular side wall portions, and inner spherical depressions concentric with such cylindrical wall, a length of tube disposed coaxially inside said shell and spanning the space between the junctures of such depressions with such outer side wall portions, and an integral layer of organic plastic material embracing such cylindrical wall and overlying such outer side wall portions and such depressions to provide spherical bearing surfaces composed of such plastic material backed up by the depressions in said shell, a pair of conical bearing members adapted to be mounted on a wheel axle opposite the respective spherical bearing surfaces, and ball cages having balls engaging the respective spherical and conical bearing surfaces for free-rotation of said wheel.

5. The wheel structure of claim 4 wherein said bearing surfaces are so disposed that diametrically opposite points of said balls are tangent to such bearing surfaces.

References Cited in the file of this patent

UNITED STATES PATENTS

| | | |
|---|---|---|
| 609,371 | Schroeder | Aug. 16, 1894 |
| 1,557,670 | De France | Oct. 20, 1925 |
| 2,022,348 | Hoerle | Nov. 26, 1935 |
| 2,136,531 | Vogt | Nov. 15, 1938 |
| 2,290,249 | Piperoux | July 21, 1942 |
| 2,629,420 | Walklet | Feb. 24, 1953 |
| 2,644,199 | Miller | July 7, 1953 |